US011381967B1

(12) United States Patent
Selvaraj et al.

(10) Patent No.: US 11,381,967 B1
(45) Date of Patent: Jul. 5, 2022

(54) SYSTEM FOR BINDING MULTIPLE SIM CARDS TO AN ELECTRONIC DEVICE

(71) Applicant: Wells Fargo Bank, N.A., San Francisco, CA (US)

(72) Inventors: Elenchezhean Selvaraj, Dublin, CA (US); Darrell L. Suen, San Ramon, CA (US); Melody Su-Shin Kao, San Francisco, CA (US); Sridhar Kotamraju, Fremont, CA (US)

(73) Assignee: Wells Fargo Bank, N.A, San Francisco, CA (US)

( * ) Notice: Subject to any disclaimer, the term of this patent is extended or adjusted under 35 U.S.C. 154(b) by 0 days.

(21) Appl. No.: 16/913,902

(22) Filed: Jun. 26, 2020

Related U.S. Application Data

(63) Continuation of application No. 15/917,072, filed on Mar. 9, 2018, now Pat. No. 10,743,181, which is a continuation of application No. 15/651,676, filed on Jul. 17, 2017, now Pat. No. 9,949,126, which is a continuation of application No. 15/347,268, filed on Nov. 9, 2016, now Pat. No. 9,749,862, which is a
(Continued)

(51) Int. Cl.
H04W 12/06 (2021.01)
H04W 8/24 (2009.01)
H04W 8/18 (2009.01)

(52) U.S. Cl.
CPC ........... H04W 12/06 (2013.01); H04W 8/183 (2013.01); H04W 8/245 (2013.01)

(58) Field of Classification Search
CPC .................................................... H04W 12/06
USPC ...................................... 455/558, 559, 435.1
See application file for complete search history.

(56) References Cited

U.S. PATENT DOCUMENTS 6,282,658 B2    8/2001   French et al.
6,393,298 B1    5/2002   Fulton
6,879,825 B1    4/2005   Daly
(Continued)

FOREIGN PATENT DOCUMENTS

WO    WO-2013/087018 A1    6/2013
WO    WO-2013/870178 A1    6/2013

OTHER PUBLICATIONS

Kett an i, et al; "Mldm: an Open Architecture for Mobile Identity Management"; Journal of Convergence; vol. 2, No. 2; Dec. 2011, 8 pages.
(Continued)

Primary Examiner — Zhitong Chen
(74) Attorney, Agent, or Firm — Foley & Lardner LLP

(57) ABSTRACT

Subscriber identity modules can be bound to devices and utilized for authentication. An initial or additional subscriber identity module can be bound to a user device, for instance after successful user authentication by way of an alternate mechanism. A subscriber identity module of a device can be identified, and carrier data associated with the subscriber identity module can be requested and received. A determination can be made regarding whether the subscriber identity module is linked to the device, for instance by an original linkage. A user profile can be automatically updated with the carrier data to bind the user to the user device based on the subscriber identity module when the subscriber identity module is verified to be linked to the user device. Subsequently, the subscriber identity module can be utilized as a basis for authentication.

20 Claims, 6 Drawing Sheets

Related U.S. Application Data continuation of application No. 14/581,166, filed on Dec. 23, 2014, now Pat. No. 9,520,911.

(56) References Cited

U.S. PATENT DOCUMENTS

| | | |
|---|---|---|
| 6,915,272 B1 | 7/2005 | Zilliacus et al. |
| 7,680,491 B2 | 3/2010 | Zabawskyj et al. |
| 8,369,887 B2 | 2/2013 | Choe et al. |
| 9,020,479 B1 | 4/2015 | Somayajula et al. |
| 9,357,378 B1 | 5/2016 | Delker et al. |
| 9,639,692 B1 | 5/2017 | Xue |
| 2003/0181219 A1 | 9/2003 | Huang |
| 2004/0019564 A1 | 1/2004 | Goldthwaite et al. |
| 2007/0015538 A1 | 1/2007 | Wang |
| 2008/0051062 A1 | 2/2008 | Lee |
| 2008/0081609 A1 | 4/2008 | Burgan et al. |
| 2010/0306107 A1 | 12/2010 | Nahari |
| 2011/0078773 A1 | 3/2011 | Bhasin et al. |
| 2012/0130901 A1 | 5/2012 | Coppinger |
| 2012/0309353 A1* | 12/2012 | Markov ............ H04W 12/06 455/411 |
| 2013/0227646 A1 | 8/2013 | Haggerty et al. |
| 2013/0331063 A1 | 12/2013 | Cormier et al. |
| 2014/0020929 A1 | 1/2014 | Hisada et al. |
| 2014/0051398 A1 | 2/2014 | Ben Shlush et al. |
| 2014/0096222 A1 | 4/2014 | Colnot |
| 2014/0172712 A1* | 6/2014 | Petersen ............ G06Q 10/00 705/44 |
| 2015/0373778 A1* | 12/2015 | Holtmanns ........... H04W 88/06 455/558 |
| 2017/0134944 A1 | 5/2017 | Christian et al. |
| 2017/0171804 A1 | 6/2017 | Waltermann et al. |

OTHER PUBLICATIONS

Kettani, et al; Mldm: an Open Architecture for Mobile Identity Management; Journal of Convergence; vol. 2, No. 2; 2011, 8 pages.

Mozillawiki, WebAPI/WebPayment/Multi-SIM; https://wikimozilla.org/WebAPI/WebPayment/Multi-SIM; Mar. 28, 2014.

Mozillawiki; WebAPI/WebPayment/Multi-SIM; https://wikimozilla.org/WebAPI/WebPayment/Multi-SIM; Mar. 28, 2014; pp. 3-4.

* cited by examiner

SYSTEM FOR BINDING MULTIPLE SIM CARDS TO AN ELECTRONIC DEVICE

CROSS-REFERENCE TO RELATED APPLICATIONS

This application is a continuation of U.S. patent application Ser. No. 15/917,072, filed Mar. 9, 2018, and entitled "SYSTEM FOR BINDING MULTIPLE SIM CARDS TO AN ELECTRONIC DEVICE," which is a continuation of U.S. patent application Ser. No. 15/651,676, now U.S. Pat. No. 9,949,126, filed on Jul. 17, 2017, and entitled SYSTEM FOR BINDING MULTIPLE SIM CARDS TO AN ELECTRONIC DEVICE," which is a continuation of U.S. patent application Ser. No. 15/347,268, now U.S. Pat. No. 9,749,862, filed Nov. 9, 2016, and entitled "SYSTEM FOR BINDING MULTIPLE SIM CARDS TO AN ELECTRONIC DEVICE," which is a continuation of U.S. patent application Ser. No. 14/581,166, now U.S. Pat. No. 9,520,911, file Dec. 23, 2014, and entitled "SYSTEM FOR BINDING MULTIPLE SIM CARDS TO AN ELECTRONIC DEVICE." The entireties of the above-noted applications are incorporated by reference herein.

BACKGROUND

A subscriber identity module or subscriber identification module (SIM) is an integrated circuit that securely stores the international mobile subscriber identity (IMSI) and the related key used to identify and authenticate subscribers on communication devices including mobile telephony devices (such as mobile phones and computers). A SIM circuit is embedded into a component of communication devices. In one instance, the component is a removable plastic card. This plastic card may be referred to as a "SIM card" and can be transferred between different communication devices. Furthermore, communication devices are being fabricated to utilize multiple SIM cards.

Because multiple SIM cards may be used or transferred between communication devices, users may make contact using their principal communication device but appear to an entity as different account holders. For example, suppose that a user (e.g., customers, account holders, subscribers, etc.) contacts an entity such as a business, non-profit organization, financial institution, educational institution, etc. The entity may have authenticated the user based on information associated with a first SIM card. However, if the user then contacts the entity using a device having an additional SIM card or cards, the entity may not be able to identify the user. Moreover, the user will be unable to use the device during the authentication process.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

As discussed above, the ability of users to employ multiple SIM cards, or SIMs, together or interchangeably, in a single device makes it difficult to use the device to authenticate the user. For example, consider that an entity, such as a financial institution, receives a call from a user using a first SIM in a device. The financial institution authenticates the user. For example, the financial institution may use personal information (e.g., social security number, routing number, account number, address information, etc.) of the user to verify the user's identity. Once the user's identity is authenticated, a profile is created for the user, which associates the user with the first SIM. In this manner, the device having the first SIM is bound to the user. Thus, the entity can authenticate the user when the user contacts the entity again using the device having the first SIM without requesting additional information from the user. However, if the user then contacts the entity using the device with a second SIM card, the entity is unable to authenticate the user based on the device because the second SIM card is unknown.

Described herein are examples of systems, methods, and other embodiments associated with multiple SIM device binding. In one embodiment, the entity receives contact from a user employing a device that is unknown to the entity. As described above, the user can be authenticated by the entity. For example, the entity may issue a one-time password (OTP) using a known channel of communication that the user has to then provide back to the entity. Additionally, or alternatively, the user may be authenticated by revealing personal data. Thus, the entity can authenticate the user even if the device the user is employing is unknown.

Subsequent transactions on behalf of the user employing the unknown device may be more efficient if the entity linked the unknown device to the known user. For example, the entity may deem it unnecessary to authenticate the user if the user contacts the entity using a known device. To link the unknown device to the user, the entity first queries the mobile network carrier to determine whether there are multiple SIMs for the device. In response to determining that the user's device has multiple SIMs, the entity requests carrier data about the user. The carrier data may include biographical data about the individual the carrier associates with the device.

The carrier data can then be compared to a profile of the user maintained by the entity. The carrier data is compared to determine whether the profile maintained by the entity includes the carrier data. If the carrier is not included, the profile is updated with the carrier data. Therefore, even if the second SIM data contradicts the user data from the profile, the profile is updated with the second SIM data. For example, the first SIM may be registered to a user for his personal use. The second SIM may be registered to a user in the name of a business for professional use. Regardless of which SIM is employed to contact the entity, the first SIM being bound to the user indicated that the second line is also be authenticated.

In addition to the user data, the entity may further query the carrier to determine if the second/additional SIM is being used in the original device to which the SIM cards were bound. The SIM not being used in the device it was originally bound to may indicate fraudulent activity. If the carrier informs the entity that the SIM is not being used in the device the SIM card was originally bound to, the comparison of the user data to the profile may be aborted and the contact by the user may be deemed fraudulent. Accordingly, in addition to multi-SIM device binding, the systems, methods, and embodiments described herein may also be employed to evaluate risk intelligence.

This binding of the second/additional SIM to the he user's device can then be used as a part of the authentication process. The systems, methods, and other embodiments associated with multi-SIM device binding can be performed for additional SIMs as discussed above, or phone numbers associated with the additional SIM may be associated with a previously bound SIM. Accordingly, despite a device being used in conjunction with multiple SIMs, the device can be used to authenticate the user.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
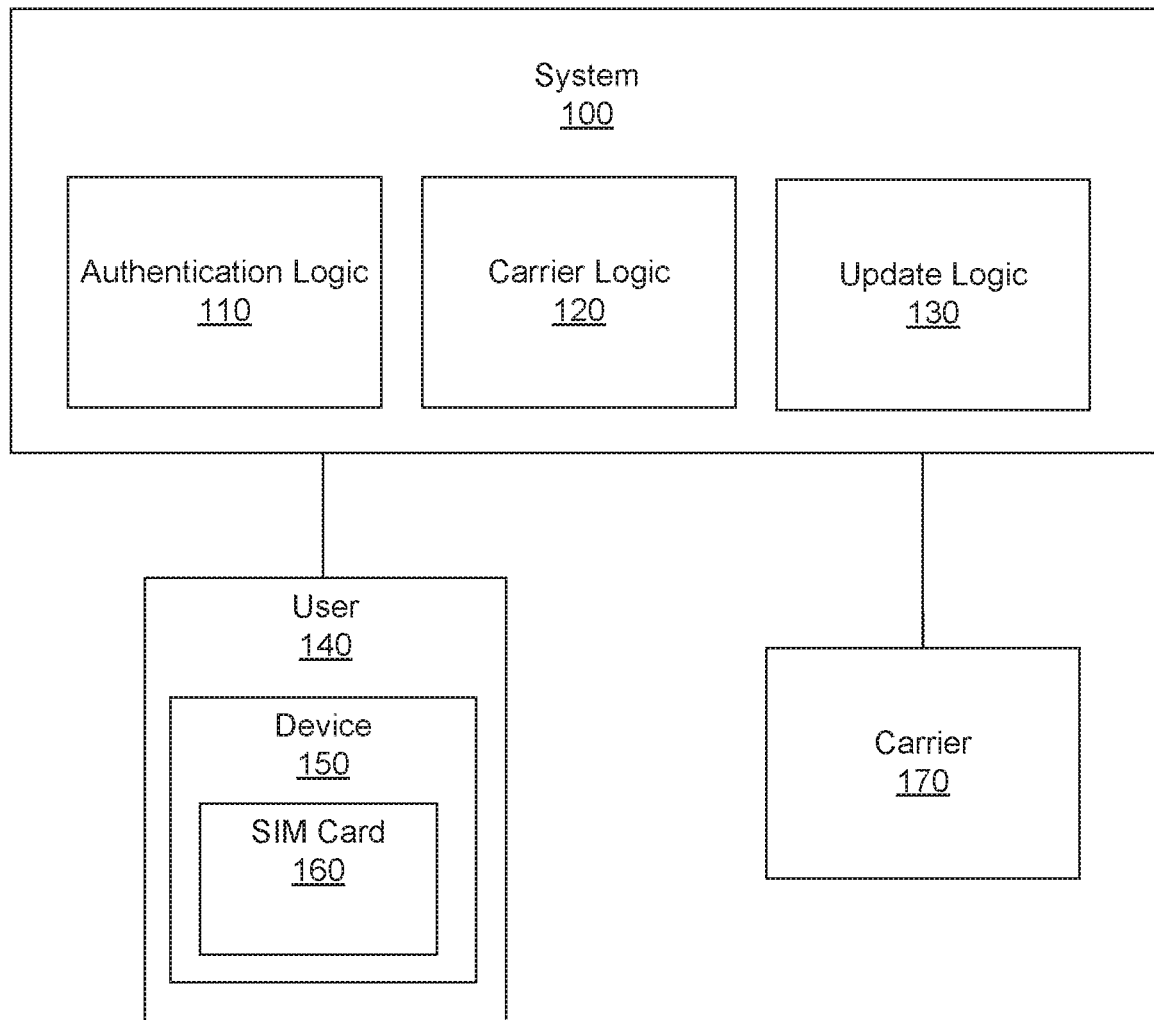
FIG. 1 illustrates one embodiment of a system associated with single-SIM card device binding.

Embodiments or examples illustrated in the drawings are disclosed below using specific language. It will nevertheless be understood that the embodiments or examples are not intended to be limiting. Any alterations and modifications in the disclosed embodiments and any further applications of the principles disclosed in this document are contemplated as would normally occur to one of ordinary skill in the pertinent art. Described herein are examples of systems, methods, and other embodiments associated with multi-SIM device binding.

FIG. 1 is an illustration of an example system 100 associated with multi-SIM card device binding. The system 100 includes an authentication logic 110, a carrier logic 120, and an update logic 130. The system 100 is used by an entity (not shown) to update entity information about a user 140 to include carrier data related to a device 150. For example, the user 140 may be a customer of the entity. To communicate with the entity, the user 140 may employ the device 150. The device 150 includes a Subscriber Identity Module (SIM) card 160. In addition to interfacing with a user 140, the system 100 may interface with a carrier 170.

The authentication logic 110 enable communication between the entity and the user 140. For example, the user 140 may contact the entity using the device 150. The device 150 may be a mobile telephone having a SIM card 160. When the user 140 contacts the entity, the authentication logic 110 confirms the identity of the user 140. For example, the user 140 may provide the authentication logic 110 with user data, such as a one-time password or personal data (e.g., name address, social security number, account number, telephone number, personal identification number (PIN), email address, etc.). The authentication logic 110 verifies the user's identity based on the user data. In one embodiment, the authentication logic 110 may compare the user data to entity data stored in a user profile. The user profile may be maintained by the system 100 or maintained by the entity remotely.

In response to the authentication logic 110 authenticating the user 140, the carrier logic 120 identifies a SIM card 160 of the device 150. For example, the carrier logic 120 may establish a data connection with the device 150 to determine if there are one or more SIM cards, such as SIM card 160, within the device 150. The SIM card 160 includes identifying information. For example, the identifying information may include a unique serial number (ICCID), international mobile subscriber identity (IMSI), security authentication and ciphering information, temporary information related to the local network, a list of the services the user has access to and two passwords: a personal identification number (PIN) for ordinary use and a personal unblocking code (PUK) for PIN unlocking, etc. The carrier 170 assimilates this identifying information as carrier data.

The carrier logic 120 then requests the carrier data for the SIM card 160 from a carrier 170. In one embodiment, the carrier supports the SIM card 160. The carrier 170 may be identified based on the identifying information of the SIM card 160. Alternatively, the carrier 170 may be a carrier service capable of accessing multiple carriers at once for carrier data. In another embodiment, the carrier 170 may not support the SIM chip 160.

The update logic 130 updates the user profile of the user 140 based on the carrier data. By updating the profile with the carrier data, the update logic 130 binds the device 150 with the SIM card 160 to the user 140, such that the relationship between the user 140 and the device 150 is formalized. Accordingly, if the user 140 contacts the entity using the device 150 having the SIM card 160, the entity will associate the contact with the user 140.

For example, suppose that a user 140 has a device 150 that is a mobile phone. Consider that the user 140 has two SIM cards and uses the mobile phone having one SIM card or the other. The SIM card 160 may be a first SIM card registered to an individual John Smith or a second SIM card may be registered to a business Smith Co. Regardless of which SIM card 160 is being used in conjunction with the device 150, the user's identity is authenticated by the authentication logic 110.

Suppose that John Smith contacts the entity using the device 150 where the SIM card 160 is the second SIM card registered to Smith Co. Once John Smith is authenticated by the authentication logic 110, the carrier logic 120 queries the carrier 170 for carrier data regarding the SIM card 160. The carrier data will include identifying information for Smith Co. The update logic 130 can then update a user profile for John Smith with carrier data regarding Smith Co. Accordingly, if John Smith subsequently contacts the entity with the device 150 having the second SIM card, the entity will recognize the call as being received from John Smith. In this manner, the entity is able to update user profiles without user intervention.

Figure 2:
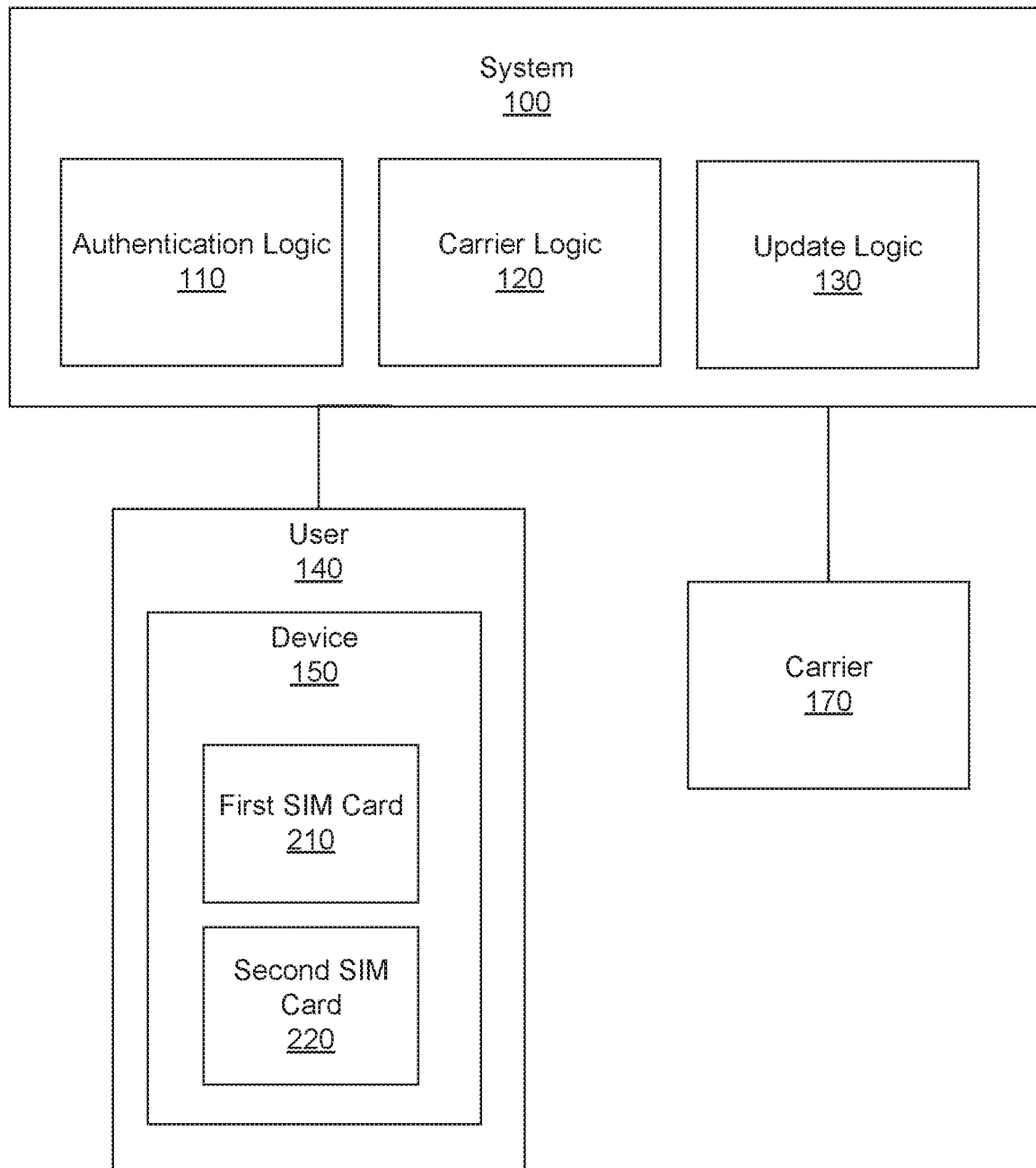
FIG. 2 illustrates one embodiment of a system associated with multi-SIM card device binding.

FIG. 2 illustrates another embodiment of a system 100 associated with multi-SIM card device binding. The system 100 includes an authentication logic 110, carrier logic 120, and update logic 130 that operate in a similar manner as discussed above with respect to FIG. 1. The system 100 interacts with the user 140, the device 150, and the carrier 170 in a similar manner as described with respect to FIG. 1. The device 150 includes a first SIM card 210 and a second SIM card 220.

In the example described above with respect to FIG. 1, the device 150 contains a single SIM card 160 that may be one of a plurality of available SIM cards. In the embodiment illustrated with respect to FIG. 2, the device 150 holds multiple SIM cards 210 and 220. A device having multiple SIM cards allows the device to operate under distinct parameters. For example, the device 150 may contain multiple SIM cards so that a user has the first SIM card 210 for domestic communication and the second SIM card 220 for international communication. Alternatively, the first SIM card may be employed for personal communication while the second SIM card may be used for professional communication.

As described above with respect to FIG. 1, once a user is authenticated by authentication logic 110, the carrier logic 120 identifies a SIM card associated with the device 150. In the embodiment described above with respect to FIG. 1, a single SIM card, SIM card 160, is identified. In the embodiment illustrated with respect to FIG. 2, multiple SIM cards, SIM card 210 and SIM card 220 are identified.

The carrier logic 120 then requests the carrier data for the SIM cards 210 and 220 from the carrier 170. In one embodiment, the carrier 170 is able to provide carrier for both SIM cards 210 and 220. For example, the carrier 170 may be linked to multiple carriers and be able to provide the requested carrier data by accessing links to other carriers. In another embodiment, the carrier 170 may access a shared database of carrier data maintained by multiple carriers. Alternatively, the carrier logic 120 may access multiple carriers based on which carriers support each of the SIM cards 210 and 220.

The update logic 130 updates the user profile of the user 140 based on the carrier data of the multiple SIM cards 210 and 220. By updating the profile with the carrier data of both the SIM cards 210 and 220, the update logic 130 binds the device 150 having each of the SIM cards 210 and 220 to the user 140, such that the relationship between the user 140 and the device 150 is formalized. Accordingly, if the user 140 contacts the entity using the device 150 having SIM card 210, SIM card 220, or both SIM cards 210 and 220, the entity will associate the contact with the user 140. While two SIM cards are shown, the device 150 may contain any number of SIM cards. The system 100 updates the profile of the user 140 for the number of SIM cards present in the device 150.

Figure 3:
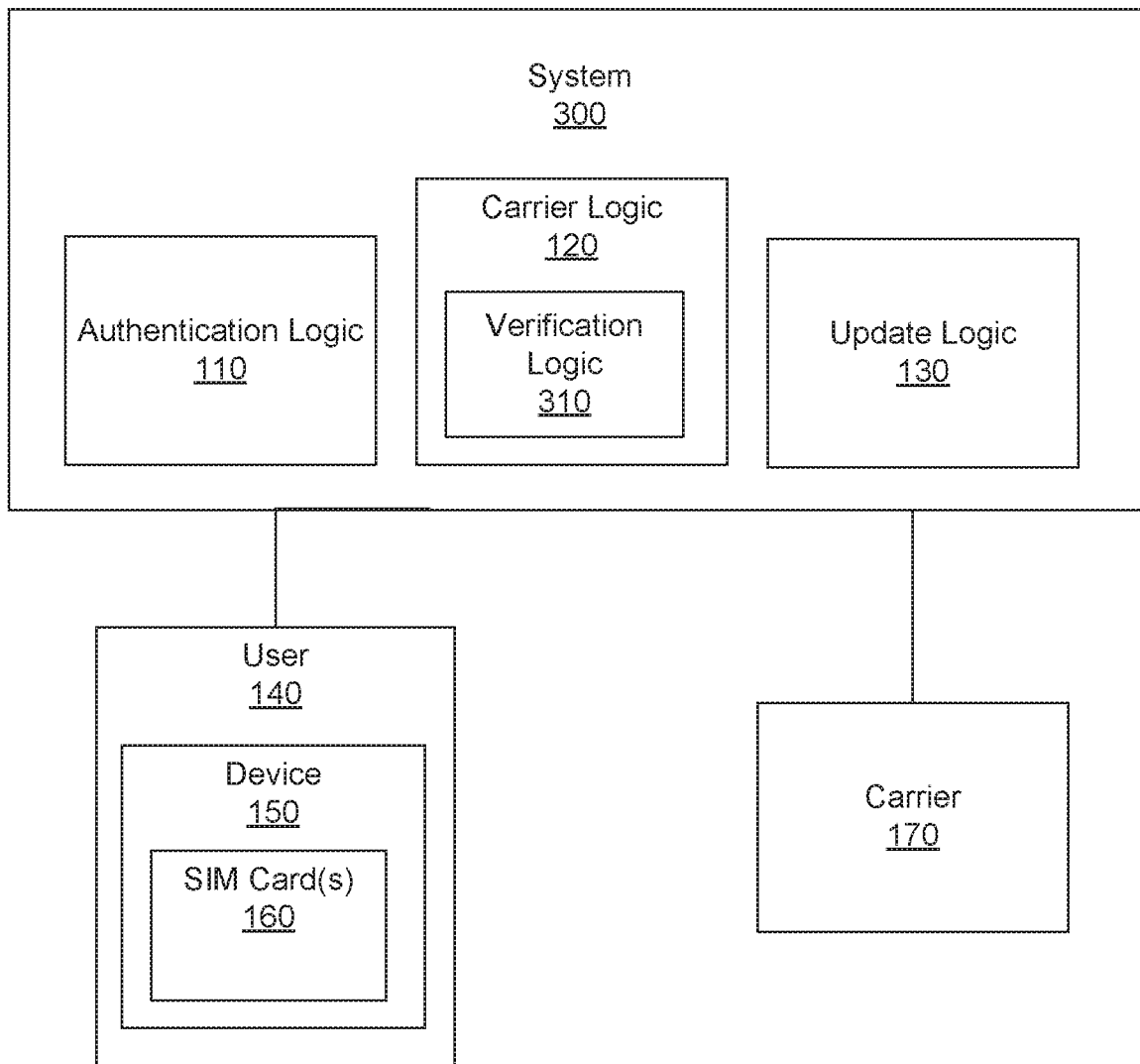
FIG. 3 illustrates another embodiment of a system having a verification logic associated with multi-SIM card device binding.

FIG. 3 illustrates an embodiment of a system 300 associated with multi-SIM card device binding. The system 300 includes an authentication logic 110, a carrier logic 120, and an update logic 130 that operate in a similar manner as discussed above with respect to FIG. 1. The carrier logic 120 further includes a verification logic 310. The system 300 interacts with the user 140, the device 150, the SIM card(s) 160, and the carrier 170 in a similar manner as described with respect to FIG. 1. It is to be noted that, while FIG. 3 illustrates a single SIM card 160, alternative aspects can be employed having multiple SIM cards as shown and described herein.

The verification logic 310 verifies that the SIM card 160 being used in the device 150 is being used in the original device to which the SIM card 160 was bound. In one embodiment, the verification logic 310 queries the carrier 170 to determine if the carrier data contains a SIM swap indicator that indicates that there is a record of the device 150 being used in conjunction with the SIM card 160. The SIM swap indicator may be a binary value that represents that the device 150 and the SIM card 160 have a linked activity history. Alternatively, the carrier data may include historical data for the association of the SIM card 160 and the device 150.

In response to the verification logic 310 verifying that the SIM card is being used in the device 150 that it has been linked to, the update logic 130 updates the user profile with the identifying information from the carrier data. If the verifying logic 310 is unable to verify that the SIM card is being used in the device 150 that it has been linked to, the update logic may not update the profile with the carrier data. A SIM card 160 that is not being used in the device 150 that it was originally linked to may indicate that SIM card has been involved in fraudulent activity. For example, a SIM card 160 being used in a device 150 that is has not been used in previously, may indicate that the SIM card 160 has been obtained from a stolen device. Accordingly, the verification logic is used to identify risk associated with the SIM card 160.

Figure 4:
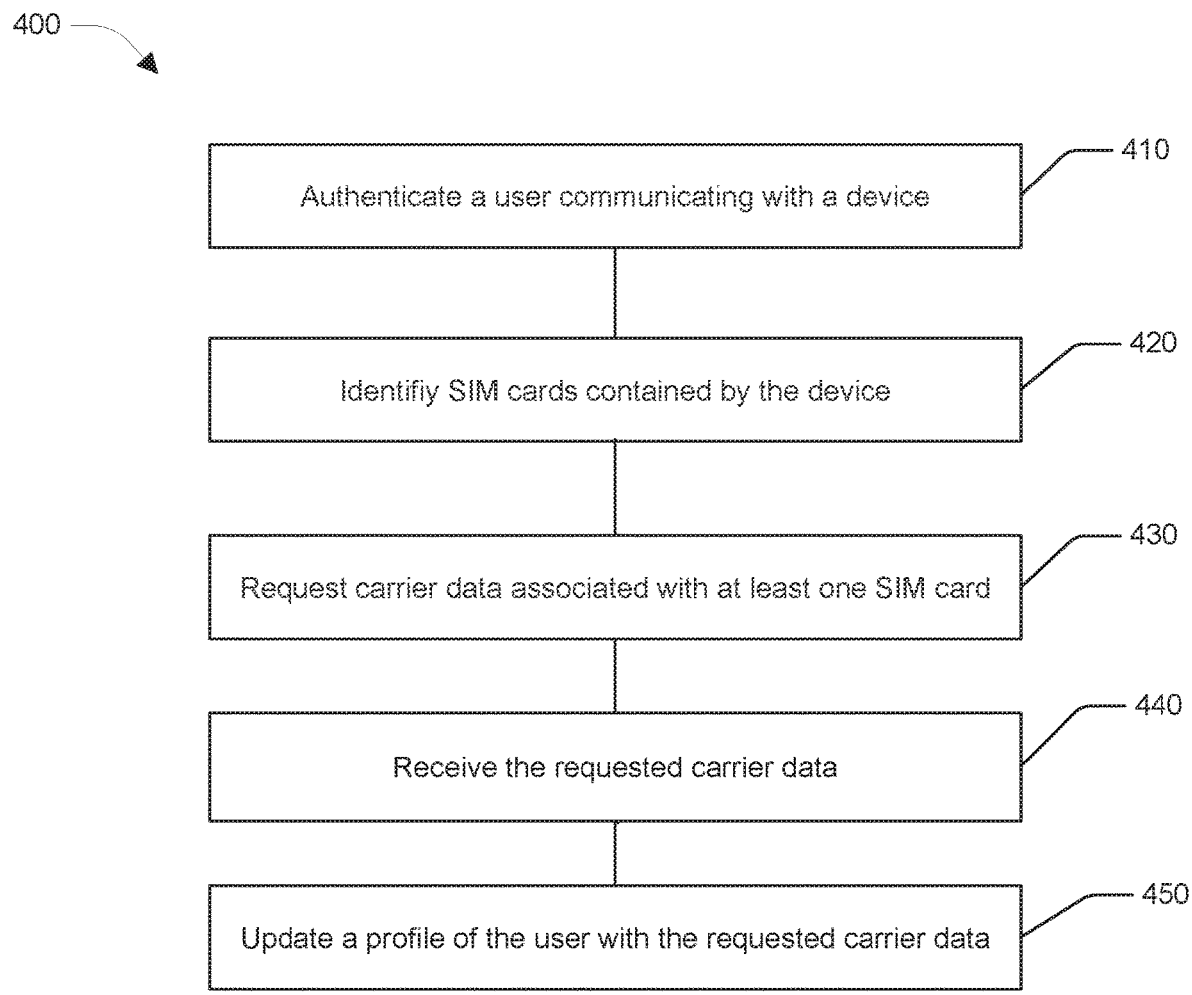
FIG. 4 illustrates one embodiment of a method associated with multi-SIM card device binding.

FIG. 4 illustrates one embodiment of a system associated with multi-SIM card device binding. At 410, a user communicating with the entity is authenticated. As described above, the user may be authenticated using any number of authentication methods. For example, the user may provide a received one-time password or personal identifying information known to the entity. Once the entity has determined that the user is the individual that the user purports to be, the entity attempts to determine if the device the user is communicating with is also known to the entity.

At 420, the SIM cards contained by the device are identified. The SIM cards may be identified utilizing a data connection with the device. For example, device data may be received for the device that enumerates the SIM cards being employed by the device. At 430, the carrier data is requested for the identified SIM cards. As described above the carrier data includes identifying information such as personal data, device data, etc. At 440, the requested carrier data is received. At 450, a profile associated with the user can be updated with the identifying information from the carrier data. In this manner, the device having the SIM cards is bound to the device.

As described above with respect to FIGS. 1 and 2, the SIM cards may be employed serially or in parallel such that the device may hold a single SIM card at a time or the device may hold a plurality of SIM cards. Regardless of how the SIM cards are used be it serially or in parallel, the profile for the user is updated as the SIM cards are able to be identified as being contained in a device. Therefore, the SIM cards may be identified one at a time as they are employed in a device having a single SIM card that is contact with an identity. Alternatively, the profile may be updated with multiple SIM cards if the device in contact with the entity contains multiple SIM cards.

Figure 5:
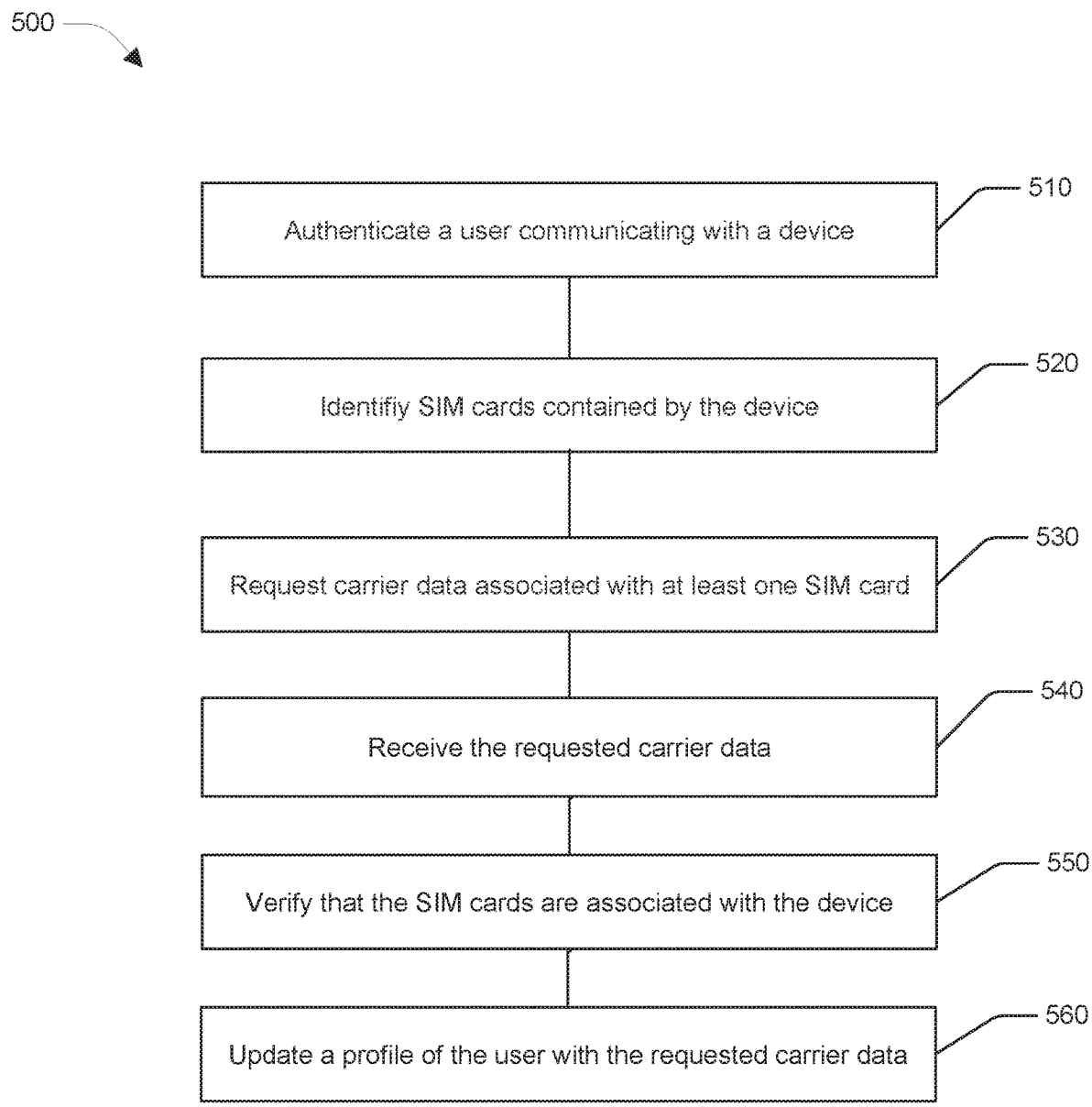
FIG. 5 illustrates one embodiment of a method associated with multi-SIM card device binding that includes verifying associated SIM cards.

FIG. 5 illustrates one embodiment of a system associated with multi-SIM card device binding. The steps 410, 420, 430, 440, and 450 of FIG. 4 correspond to steps 510, 520, 530, 540, and 560 of FIG. 5. Accordingly, steps 510, 520, 530, 540, and 560 operate in a similar manner as described above with respect to FIG. 4. At 510, a user is authenticated. The user may have a data connection with an entity by using a device. At 520, SIM cards associated with the device are identified, and at 530, the carrier data for the SIM cards is requested. At 540, the requested carrier data for the SIM cards is received.

At 550, it is verified that the SIM cards have been associated with the device. For example, it is determined that the SIM cards have been previously bound to the device. In one embodiment, the determination is made by identifying a history of activity between the SIM cards and the device. Alternatively, a SIM swap indicator may indicate that the device and SIM card have been used in conjunction with another previously. Based on the affirmative determination that the SIM cards and the device have been used together previously, at 560 the user profile is updated with the requested carrier data. If instead at 550 there is a negative determination such that it cannot be verified that the SIM cards have been used in conjunction with the device, the profile may not be updated with the carrier data because there is a risk associated with the SIM cards.

Figure 6:
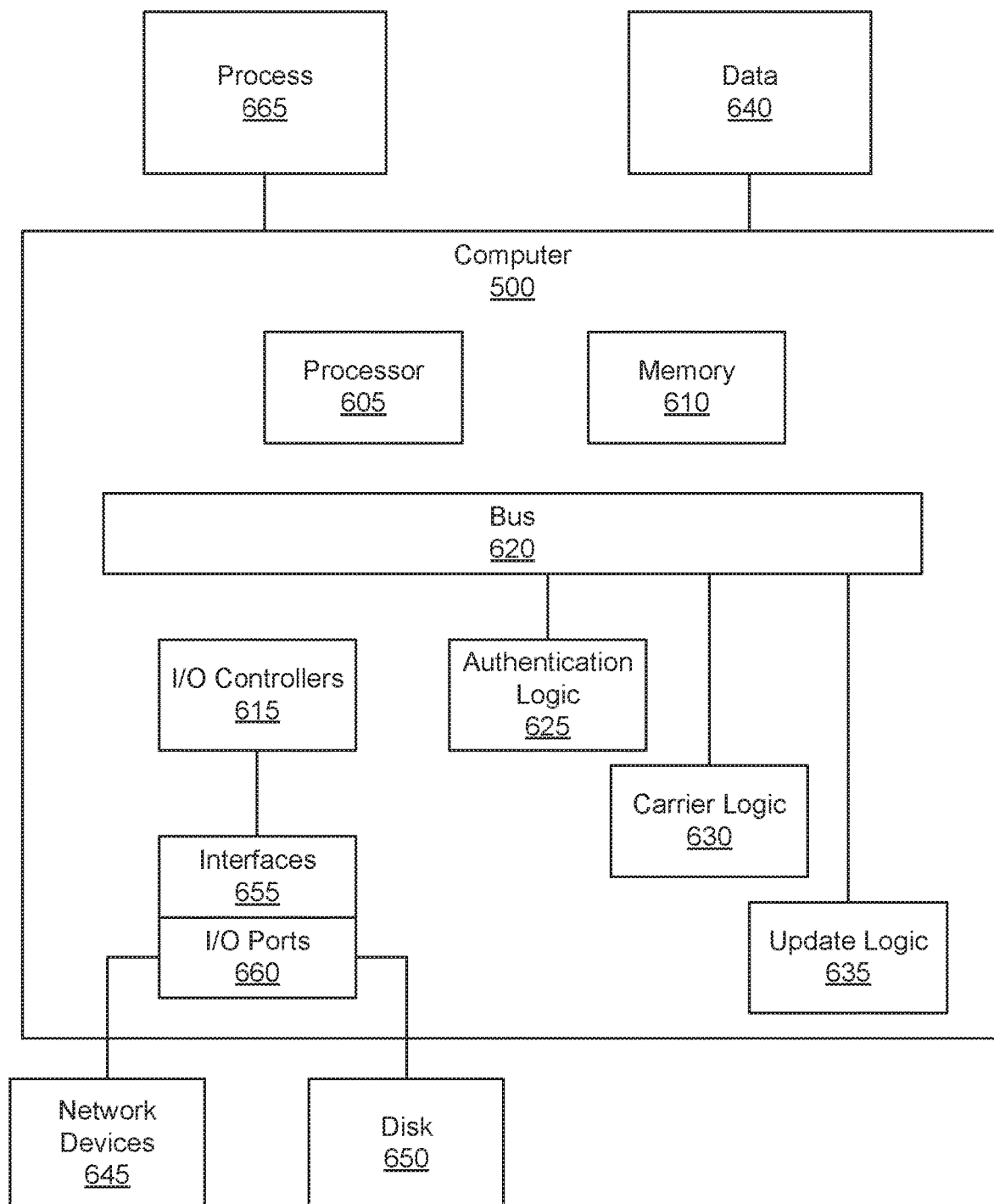
FIG. 6 illustrates one embodiment of an example computer environment associated with multi-SIM card device binding.

FIG. 6 illustrates one embodiment of an example computer environment associated with multi-SIM card device binding. The computer environment in which the systems and methods described herein, and equivalents, may operate may include a computer 600. The computer includes a processor 605, a memory 610, and input/output (I/O) ports 615 operably connected by a bus 620. In one example, the computer 600 may include an authentication logic 625, a carrier logic 630, and an update logic 635. The authentication logic 625 is configured to authenticate a user such that the user is identified as the individual that the user purports to be. The carrier logic is configured to contact a carrier and request carrier data that includes identifying information for a SIM card and corresponding user. The update logic is configured to update the user's profile with the carrier data such that subsequent communication in which the device is used may be attributed to the user.

In different examples, the authentication logic 625, the carrier logic 630, and the update logic 635 may be implemented in hardware, a non-transitory computer-readable medium with stored instructions, firmware, and/or combinations thereof. While the authentication logic 625, the carrier logic 630, and the update logic 635 are illustrated as hardware components attached to the bus 620, it is to be appreciated that in one example, the authentication logic 625, the carrier logic 630, and/or the update logic 635 could be implemented in the processor 605. Moreover, the authentication logic 625, the carrier logic 630, and/or the update logic 635 may be stored in the memory 610.

In one embodiment, the authentication logic 625 is a means (e.g., hardware, non-transitory computer-readable medium, firmware) for receiving contact from a user and authenticating the user's identity. The carrier logic 635 is a means (e.g., hardware, non-transitory computer-readable medium, firmware) for interfacing with at least one carrier or carrier data storage to request and receive carrier data associated with SIM cards identified in the user's device. The update logic is a means (e.g., hardware, non-transitory computer-readable medium, firmware) for updating a user's profile based on the received carrier data. The means may be implemented, for example, as an ASIC programmed to facilitate data editing in a web-based interactive web response system. The means may also be implemented as stored computer executable instructions that are presented to computer 600 as data 640 that are temporarily stored in memory 610 and then executed by processor 605.

Generally describing an example configuration of the computer 600, the processor 605 may be a variety of various processors including dual microprocessor and other multiprocessor architectures. The memory 610 may include volatile memory and/or non-volatile memory. Non-volatile memory may include, for example, ROM, PROM, and so on. Volatile memory may include, for example, RAM, SRAM, DRAM, and so on.

Network device 645 and a disk 650 may be operably connected to the computer 600 via, for example, an I/O interfaces (e.g., card, device) 655 and an I/O ports 660. The disk 645 may be, for example, a magnetic disk drive, a solid state disk drive, a floppy disk drive, a tape drive, a Zip drive, a flash memory card, a memory stick, and so on. Furthermore, the disk 645 may be a CD-ROM drive, a CD-R drive, a CD-RW drive, a DVD ROM, and so on. The memory 610 can store data 640 and/or a process 665, for example. The disk 650 and/or the memory 610 can store an operating system that controls and allocates resources of the computer 600.

The bus 620 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 620 can be types including, for example, a memory bus, a memory controller, a peripheral bus, an external bus, a crossbar switch, and/or a local bus.

The computer 600 may interact with I/O devices via the I/O interfaces 655 and the I/O ports 660. Input/output devices may be, for example, a keyboard, a microphone, a pointing and selection device, cameras, video cards, displays, the network devices 645, the disk 650, and so on. The I/O ports 660 may include, for example, serial ports, parallel ports, and USB ports.

The computer 600 can operate in a network environment and thus may be connected to the network devices 645 via the I/O interfaces 655, and/or the I/O ports 660. Through the network devices 645, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C. § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C. § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
a processor coupled to a memory that stores instructions that, when executed by the processor, cause the processor to:
authenticate a user identity based on user data stored in a user profile;
identify a first subscriber identity module (SIM) and a second SIM associated with a user device;
request, from a first carrier, carrier data associated with the first SIM and the second SIM, wherein the carrier data includes an indication that the first SIM and the second SIM are being used by the user device, and wherein the carrier data indicates that the first SIM is associated with the first carrier and the second SIM is associated with a second carrier;
verify that the first SIM and the second SIM are linked with the user device based on the indication in the carrier data;
responsive to verifying that the first SIM and the second SIM are linked with the user device, update the user profile automatically with the carrier data to bind the user to the user device based on the first SIM and the second SIM; and
utilize the first SIM and the second SIM in parallel.

2. The system of claim 1, the instructions further cause the processor to reauthenticate the user based on the first SIM or the second SIM.

3. The system of claim 1, the instructions further cause the processor to flag contact as fraudulent when verification that the first SIM or the second SIM is linked to the user device fails.

4. The system of claim 1, the instructions further cause the processor to:
compare the carrier data with the user profile to determine if the user profile includes the carrier data; and
update the user profile with the carrier data when the carrier data is not present in the user profile.

5. The system of claim 4, the instructions further cause the processor to abort the user update and classify contact as fraudulent when verification that the first SIM or the second SIM is linked originally to the user device fails.

6. The system of claim 1, wherein the first SIM or the second SIM are encoded on a removable card.

7. The system of claim 1, the instructions further cause the processor to abort further action when authentication of the user identity fails.

8. The system of claim 1, wherein verify that the first SIM or the second SIM are linked originally with the user device comprises evaluation of a swap indicator in the carrier data to determine whether the subscriber identity module and the user device have a linked history.

9. The system of claim 1, wherein the user profile includes data regarding at least a third SIM associated with the user device.

10. A method, comprising:
   authenticating a user identity based on user data stored in a user profile;
   identifying a first subscriber identity module (SIM) and a second SIM associated with a user device;
   requesting, from a first carrier, carrier data associated with the first SIM and the second SIM, wherein the carrier data includes an indication that the first SIM and the second SIM are being used by the user device, and wherein the carrier data indicates that the first SIM is associated with the first carrier and the second SIM is associated with a second carrier;
   verifying that the first SIM and the second the SIM are linked with the user device based on the indication in the carrier data;
   responsive to verifying that the first SIM and the second SIM are linked with the user device, updating the user profile automatically with the carrier data to bind the user to the user device based on the first SIM and the second SIM; and
   utilizing the first SIM and the second SIM in parallel.

11. The method of claim 10, further comprising reauthenticating the user based on the first SIM or the second SIM.

12. The method of claim 10, further comprising:
   comparing the carrier data with the user profile to determine if the user profile includes the carrier data; and
   updating the user profile with the carrier data when the carrier data is not present in the user profile.

13. The method of claim 12, further comprising aborting the user update and classify contact as fraudulent when verification that the first SIM or the second SIM is linked originally to the user device fails.

14. The method of claim 10, further comprising aborting further action when authentication of the user identity fails.

15. The method of claim 10, wherein verifying that the first SIM or the second SIM is linked originally with the user device comprises evaluating a swap indicator in the carrier data to determine whether the subscriber identity module and the user device have a linked history.

16. The method of claim 10, further comprising flagging contact as fraudulent when verification that the first SIM or the second SIM is linked originally to the user device fails.

17. A non-transitory computer-readable storage device comprising instructions that, when executed by a processor, cause the processor to perform operations, comprising:
   authenticating a user identity based on user data stored in a user profile;
   determining a first subscriber identity module (SIM) and a second SIM associated with a user device;
   requesting, from a first carrier, carrier data associated with the first SIM and the second SIM, wherein the carrier data includes an indication that the first SIM and the second SIM are being used by the user device, and wherein the carrier data indicates that the first SIM is associated with the first carrier and the second SIM is associated with a second carrier;
   verifying that the first SIM and the second the SIM are linked with the user device based on the indication in the carrier data received in response to the request; and
   responsive to verifying that the first SIM and the second SIM are linked with the user device, updating the user profile automatically with the carrier data to bind the user to the user device based on the first SIM and the second SIM; and
   utilizing the first SIM and the second SIM in parallel.

18. The non-transitory computer-readable storage device of claim 17, the operations further comprising reauthenticating the user based on the first SIM or the second SIM.

19. The non-transitory computer-readable storage device of claim 17, the operations further comprising:
   comparing the carrier data with the user profile to determine if the user profile includes the carrier data; and
   updating the user profile with the carrier data when the carrier data is not present in the user profile.

20. The non-transitory computer-readable storage device of claim 19, the operations further comprising aborting the user update and classifying contact as fraudulent when verification that the first SIM or the second SIM is linked to the user device fails.

* * * * *